United States Patent [19]

Boxum et al.

[11] Patent Number: 4,996,850

[45] Date of Patent: Mar. 5, 1991

[54] AIR CONDITIONER WITH EXHAUST FEATURE

[75] Inventors: Bruce Boxum, Angola, Ind.; Kenneth Holt, Wichita, Kans.; Kendall Eck, Wichita, Kans.; Carl Wiemeyer, Wichita, Kans.

[73] Assignee: Coleman R.V. Products, Inc., Wichita, Kans.

[21] Appl. No.: 311,721

[22] Filed: Feb. 16, 1989

[51] Int. Cl.$^5$ ............................................. F25D 17/08
[52] U.S. Cl. ............................... 62/409; 137/625.45; 137/875; 415/46; 415/148; 415/152
[58] Field of Search ................... 415/46, 148, 150; 137/625.45, 875; 62/409, 410

[56] References Cited

U.S. PATENT DOCUMENTS

| | | | |
|---|---|---|---|
| 1,448,941 | 3/1923 | Powell | 137/625.45 |
| 3,305,162 | 2/1967 | Hall, Jr. | 415/148 X |
| 3,318,225 | 5/1967 | May | 137/875 X |
| 3,450,333 | 6/1969 | Nihot et al. | 415/148 X |
| 4,248,570 | 3/1981 | Conger, IV | 415/148 |
| 4,628,702 | 12/1986 | Boxum | 62/244 |
| 4,641,502 | 2/1987 | Aldrich et al. | 62/244 |
| 4,718,457 | 1/1988 | Luger | 137/875 |

Primary Examiner—William E. Tapolcai

[57] ABSTRACT

An air conditioning apparatus is provided with an exhaust feature for exhausting air from the living enclosure. The air conditioning apparatus includes an evaporator blower for moving air from the living enclosure through an evaporator coil and back to the living enclosure. The evaporator blower includes a blower housing which includes an air inlet and an air outlet, and an exhaust opening is provided in the blower housing. An exhaust door is pivotally mounted on the blower housing and is movable between a first position in which the exhaust door closes the exhaust opening in the blower housing and a second position in which the exhaust door closes the air outlet of the blower housing and the exhaust opening is opened. When the door is in the second position, air is exhausted from the living enclosure through the exhaust opening.

5 Claims, 5 Drawing Sheets

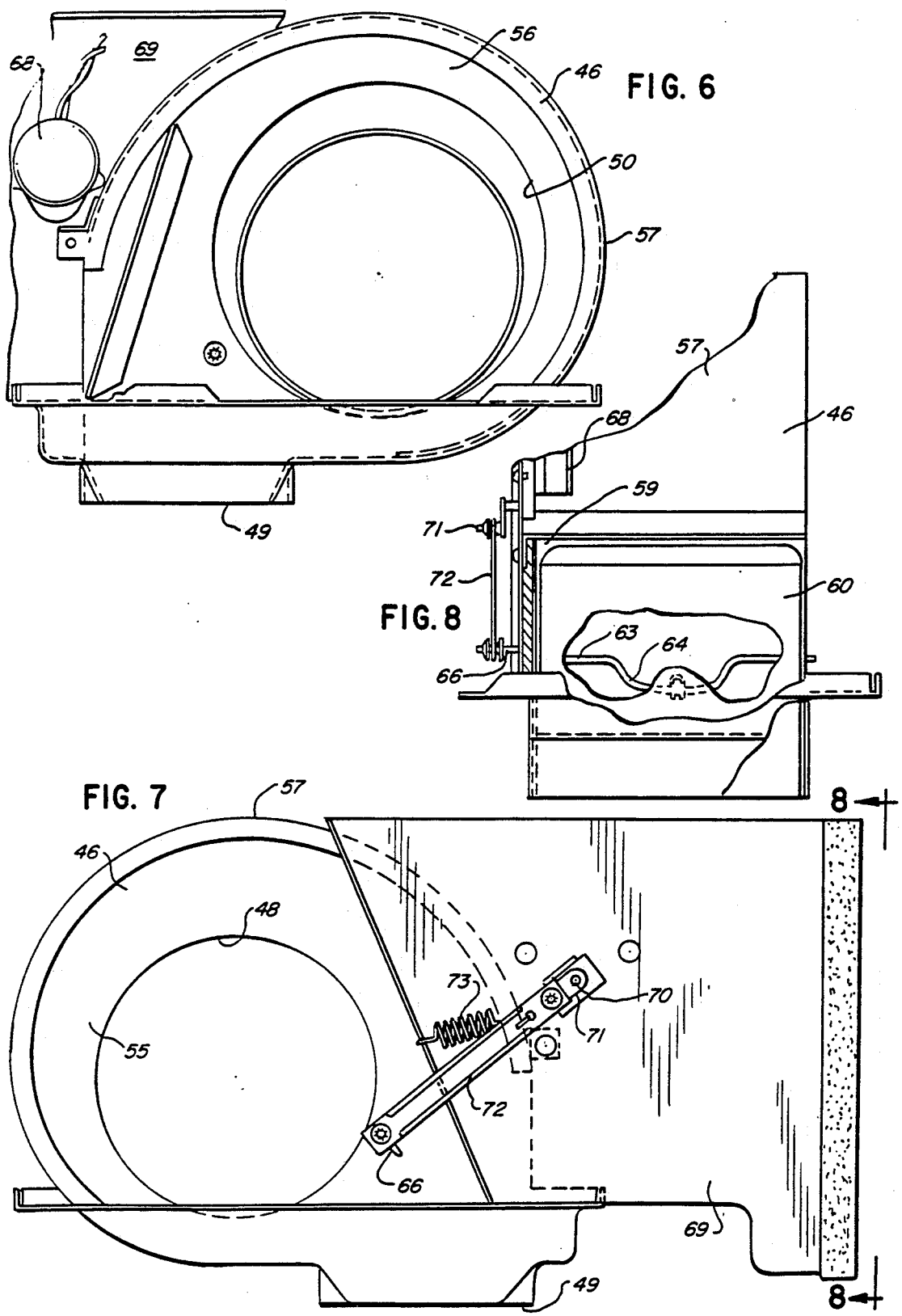

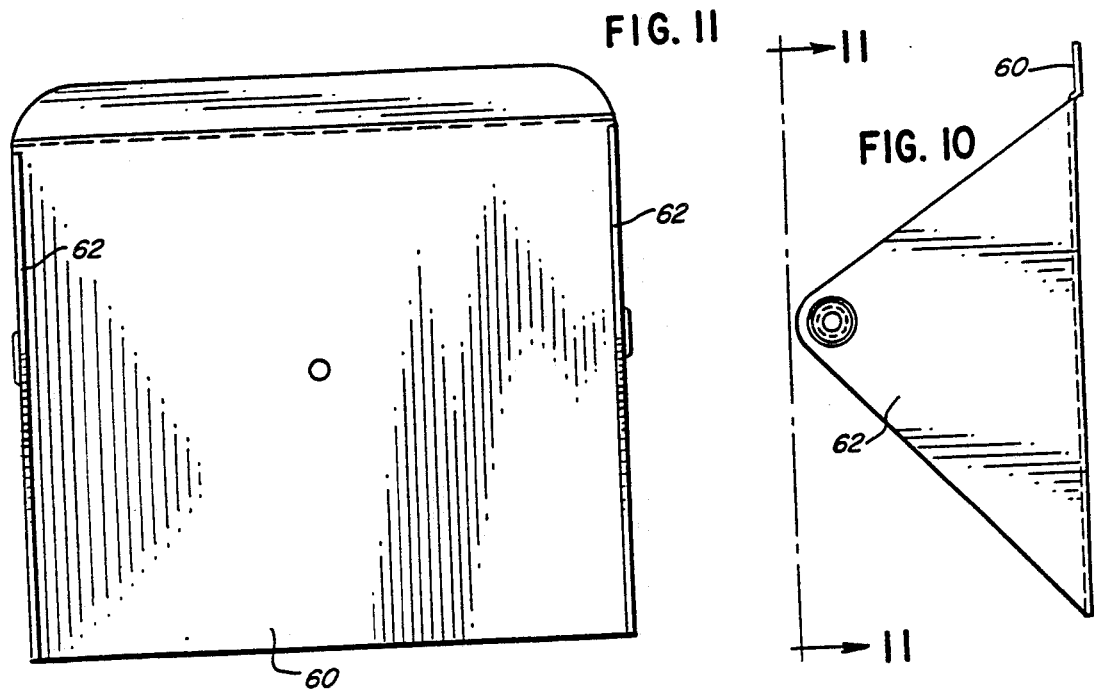
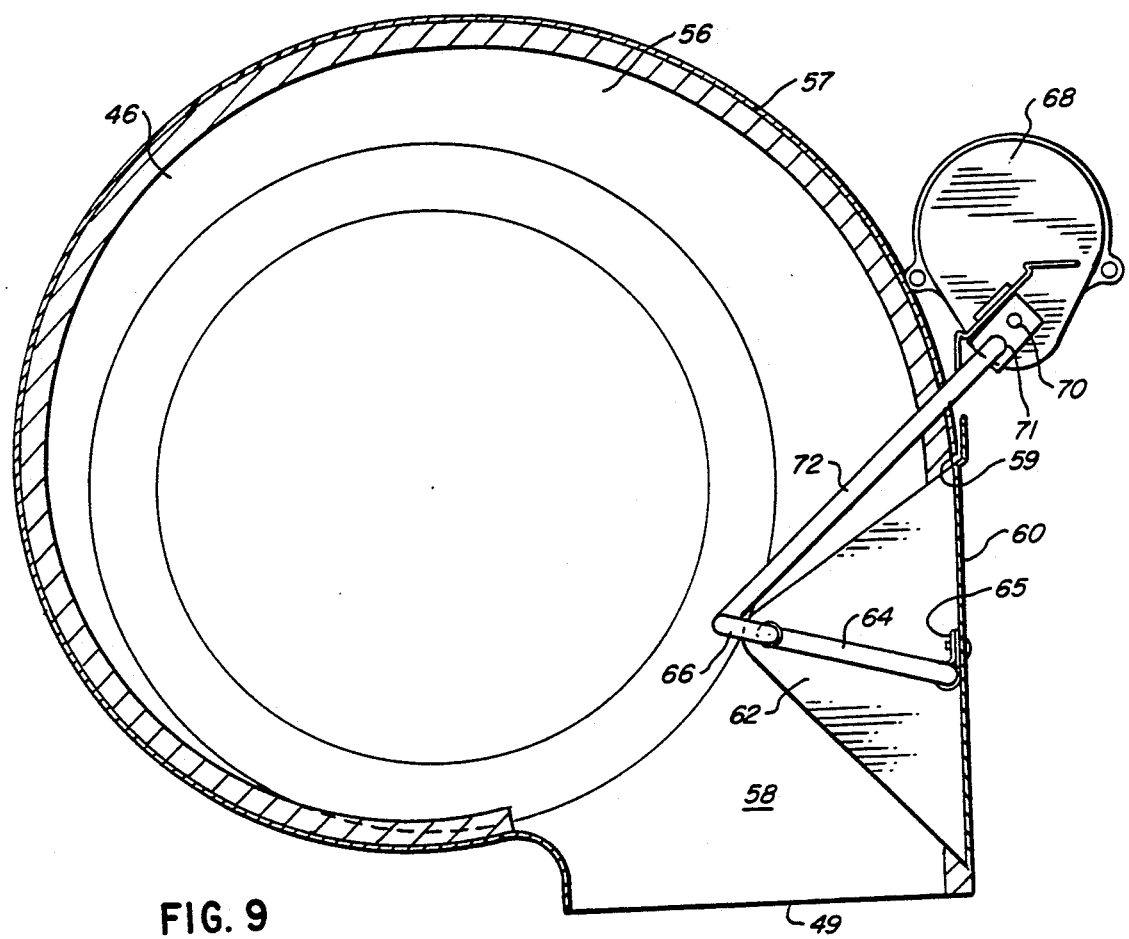

AIR CONDITIONER WITH EXHAUST FEATURE

BACKGROUND AND SUMMARY

Air conditioners generally include a separate evaporator and condenser compartments. An evaporator coil and an evaporator blower are mounted in the evaporator compartment, and a condenser coil and a condenser blower are mounted in the condenser compartment. The evaporator blower draws air from the living enclosure through the evaporator coil and returns the cooled air to the living enclosure.

The invention provides an exhaust feature for an air conditioner. An exhaust opening is provided in the housing of the evaporator blower. A door is pivotally mounted on the blower housing and is movable between a first position in which the door closes the exhaust opening and a second position in which the door closes the outlet opening of the blower housing and the exhaust opening is opened. A motor mounted on the blower housing is connected to the door by crank arms and a link, and when the motor is actuated, the crank arms and link move the door from the first position to the second position. When the door is in the second position, air is exhausted from the living enclosure through the exhaust opening.

DESCRIPTION OF THE DRAWING

The invention will be explained in conjunction with an illustrative embodiment shown in the accompanying drawing, in which

FIG. 6 is an elevational view of one side of the evaporator blower housing;

FIG. 7 is an elevational view of the other side of the evaporator blower housing;

FIG. 8 is an end view taken along the line 8-8 of FIG. 7;

FIG. 9 is a sectional view through the evaporator blower housing;

FIG. 10 is a side view of the exhaust door;

FIG. 11 is an end view of the exhaust door taken along the line 11-11 of FIG. 10;

DESCRIPTION OF SPECIFIC EMBODIMENT

Figure 1:
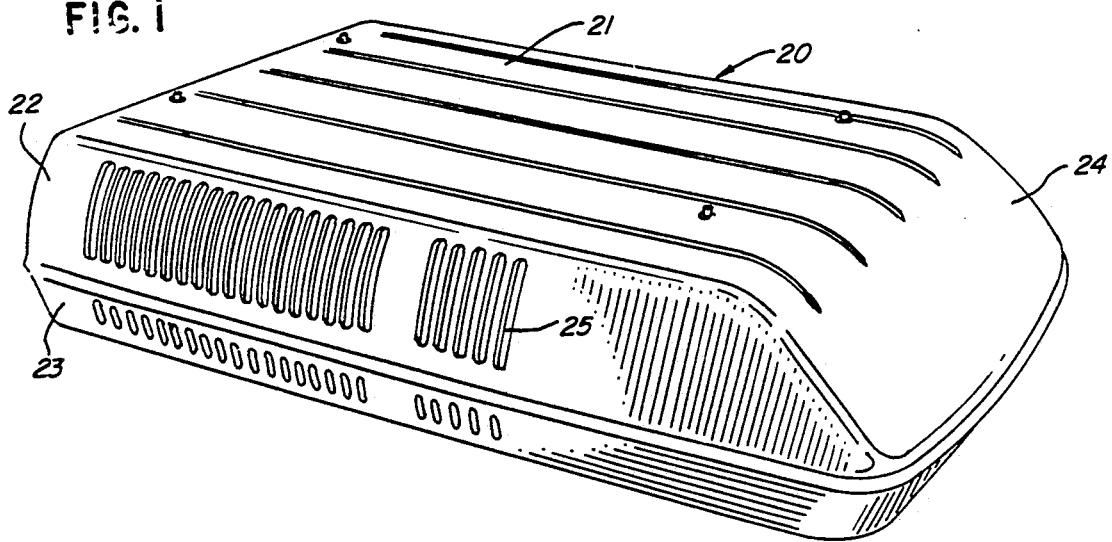
FIG. 1 is a perspective view of an air conditioning apparatus adapted to be mounted on the roof of a recreational vehicle.

FIG. 1 illustrates an air conditioning apparatus 20 which is adapted for mounting on the roof of a recreational vehicle such as a travel trailer, motor home, or the like. However, it will be understood that the invention is not limited to rooftop air conditioners and can be used in other types of air conditioners, for example, window units.

The air conditioning apparatus 20 includes an outer shroud 21 which is formed by top and bottom shrouds 22 and 23. The shroud has a streamlined front end 24, and air vents 25 are formed in the sides and rear of the shroud for permitting outside cooling air to circulate past the condenser coil.

Figure 2:
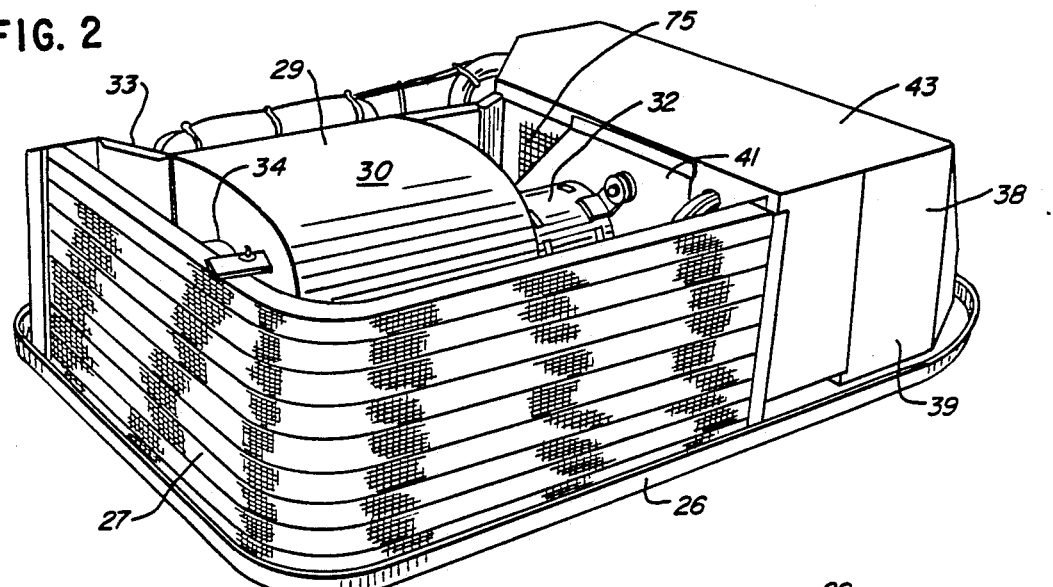
FIG. 2 is a perspective view of one side of the air conditioning apparatus with the outer shroud removed.
Figure 3:
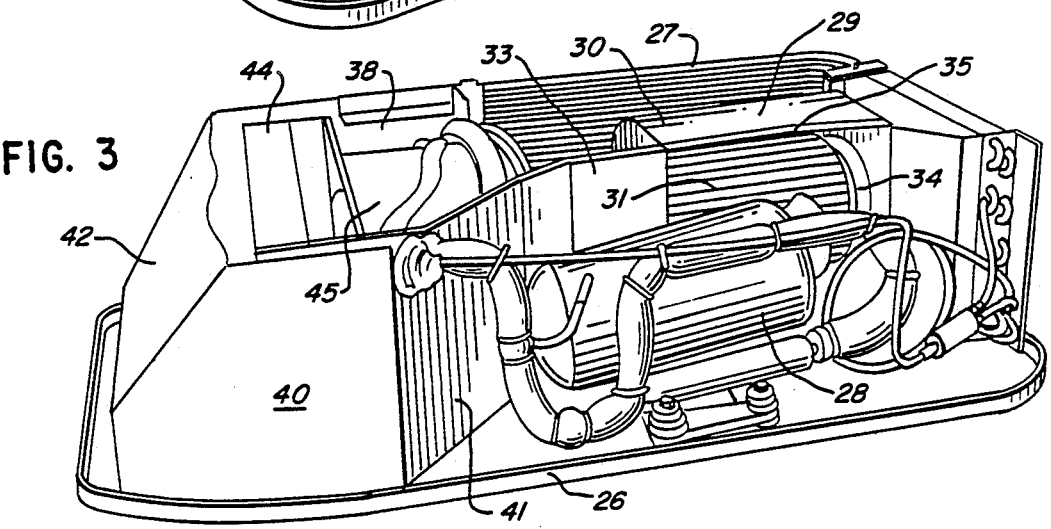
FIG. 3 is a perspective view of the other side of the air conditioning apparatus with the outer shroud removed.

FIGS. 2 and 3 illustrate the air conditioning apparatus with the shroud removed. A generally rectangular base pan 26 supports an L-shaped condenser coil 27, a rotary compressor 28, and a condenser coil blower assembly 29. The blower assembly 29 includes a scroll or housing 30 and an impeller or blower wheel 31 which is rotated within the housing by a motor 32. The blower housing is connected to a wall panel 33 between the condenser coil 27 and the compressor 28, and a condenser coil compartment is thereby formed within the air conditioning apparatus. A top panel which covers the condenser coil compartment has been removed to facilitate illustration.

The blower housing includes side inlet openings 34 and an outlet opening 35 which opens toward the compressor. Cooling air is drawn by the condenser coil blower from outside of the shroud through the condenser coil and is forced out of the shroud vents on the side adjacent the compressor.

An enclosed evaporator coil compartment 38 is formed by side panels 39 and 40, rear panel 41, front panel 42, and top panel 43. The top panel 43 is removed in FIG. 3 to expose an evaporator coil 44 and an evaporator blower assembly 45 which are mounted within the evaporator coil compartment.

Figure 5:
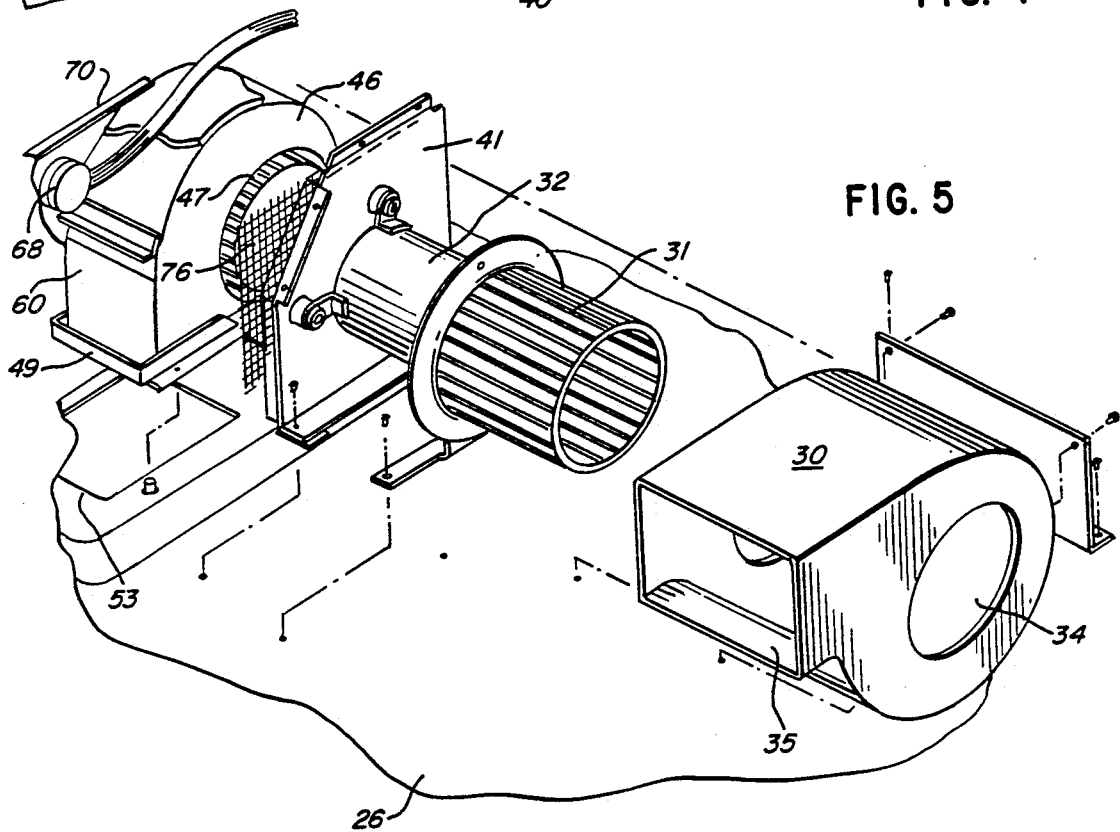
FIG. 5 is an exploded perspective view of the evaporator blower assembly and the condenser blower assembly.

Referring to FIGS. 5-7, the evaporator blower assembly 45 includes a scroll or housing 46 and an impeller or blower wheel 47 which is driven by the motor 32. The blower housing 46 is provided with an air inlet opening 48 on one side of the housing and a downwardly directed rectangular air outlet opening 49. An opening 50 on the other side of the housing is closed by rear panel 41.

Figure 4:
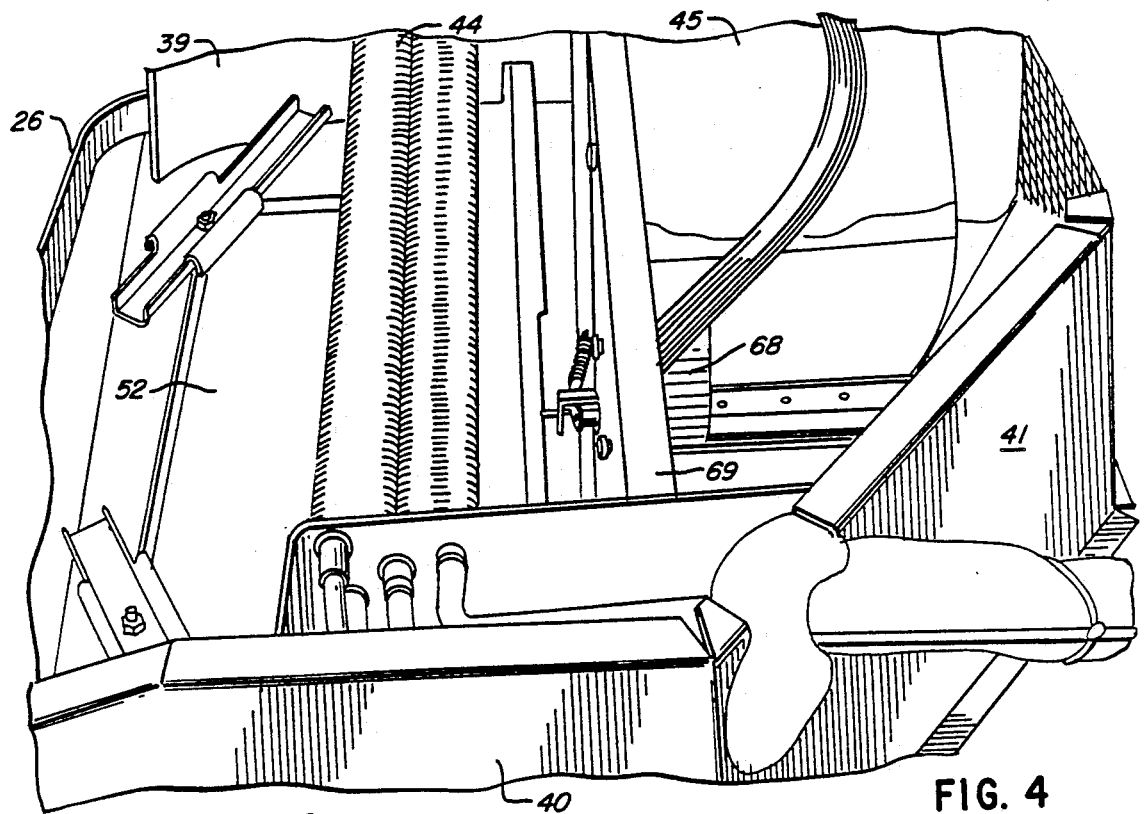
FIG. 4 is a fragmentary perspective view of the evaporator coil compartment with the top panel removed.
Figure 14:
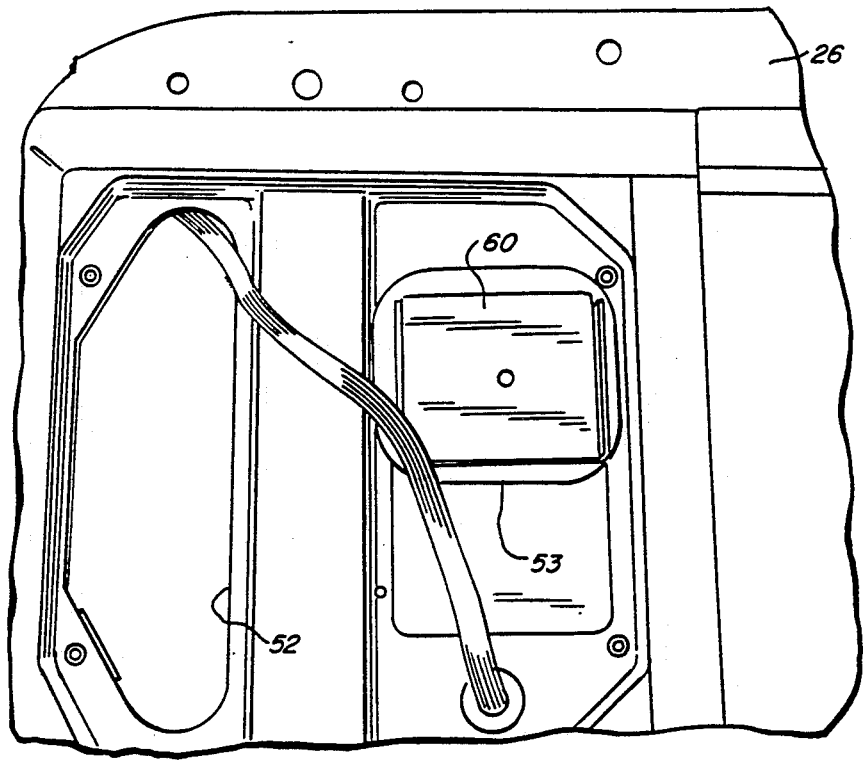
FIG. 14 is a view similar to FIG. 13 showing the exhaust door in the exhaust position in which it closes the outlet opening in the base plate.

An air inlet opening 52 (FIGS. 4 and 14) is provided through the front portion of the base pan 26 forwardly of the evaporator coil 44. A rectangular air outlet opening 53 is provided through the base pan rearwardly of the evaporator coil. The blower housing 46 is attached to the base pan with its air outlet opening 49 aligned with the air outlet opening 53 in the base pan.

When the air conditioner is mounted on the roof of a recreational vehicle, the inlet and outlet openings in the base pan are located above a standard size 14 inch by 14 inch opening in the roof. A conventional air splitter is mounted on the ceiling of the vehicle and includes an air intake duct which communicates with the air inlet opening 52 and an air outlet duct which communicates with the air outlet opening 53. The evaporator blower 45 pulls warm air from the living enclosure within the vehicle through the air inlet opening 48 in the base pan and through the cold evaporator coil 44 and discharges cool air through the air outlet opening 53 into the living enclosure.

The air conditioning apparatus which has been described up to this point may be conventional and includes standard, well-known components. The unique features of this invention relate to an exhaust door on the evaporator blower housing which permits stale room air to be exhausted from the living enclosure.

Referring to FIGS. 6–9 and 12, the conventionally shaped evaporator blower housing 46 includes a pair of flat side walls 55 and 56 and a curved wall 57. The curved wall 57 forms a discharge chute 58 which extends generally tangentially to the blower wheel which is mounted in the housing. A rectangular exhaust opening 59 is provided in the curved wall 57 adjacent the discharge opening 49. An exhaust door 60 is pivotally mounted on the blower housing and is pivotable between a first position illustrated in FIGS. 8, 9, and 13 in which the door closes the exhaust opening 59 and a second position illustrated in FIGS. 12 and 14 in which the door extends across the discharge chute 58 and closes the discharge opening 49.

The exhaust door 60 includes a pair of triangular side plates 62 which extend along the inside surfaces of the side walls 55 and 56 of the blower housing. The exhaust door is pivotally supported by a mounting shaft 63 which extends through the side walls 55 and 56 and through the side plates 62 adjacent the peaks of the triangles. The middle portion 64 of the mounting shaft is U-shaped and is secured to the exhaust door 60 by a bracket 65. One end of the mounting shaft is bent to form a crank arm 66 (FIGS. 7–9).

An electric synchronous motor 68 is mounted on a panel 69 which is attached to the side wall 55 of the blower housing. The motor includes a drive shaft 70, and a crank arm 71 is attached to the drive shaft. A link 72 connects the crank arm 71 of the motor and the crank arm 66 of the mounting shaft. When the motor is actuated, the drive shaft rotates the crank arm 71 from its FIG. 9 position to its FIG. 12 position and pivots the exhaust door. A spring 73 is connected to the link 72 and to the panel 69 for normally maintaining the exhaust door in its FIG. 9 position in which it closes the exhaust opening 59.

The exhaust opening 59 in the evaporator blower housing communicates with the condenser coil compartment through an opening 75 (FIG. 2) which is covered by a screen or mesh 76 (FIG. 5). The air path between the exhaust opening 59 and the opening 75 is sealed from the evaporator coil compartment by the top panel 43 of the evaporator coil compartment which extends across the top of the rear wall 41, the panel 69 on which the motor 68 is mounted, and the top of the blower housing 46.

During normal operation of the air conditioning apparatus, the exhaust door 60 closes the exhaust opening 59. Air is drawn by the evaporator blower from the living enclosure through the air intake opening 52 of the base pan and through the evaporator coil 44, and cool air is discharged by the evaporator blower through the air outlet opening 53 of the base pan. The spring 73 maintains the exhaust door in the closed position during normal operation.

Figure 12:
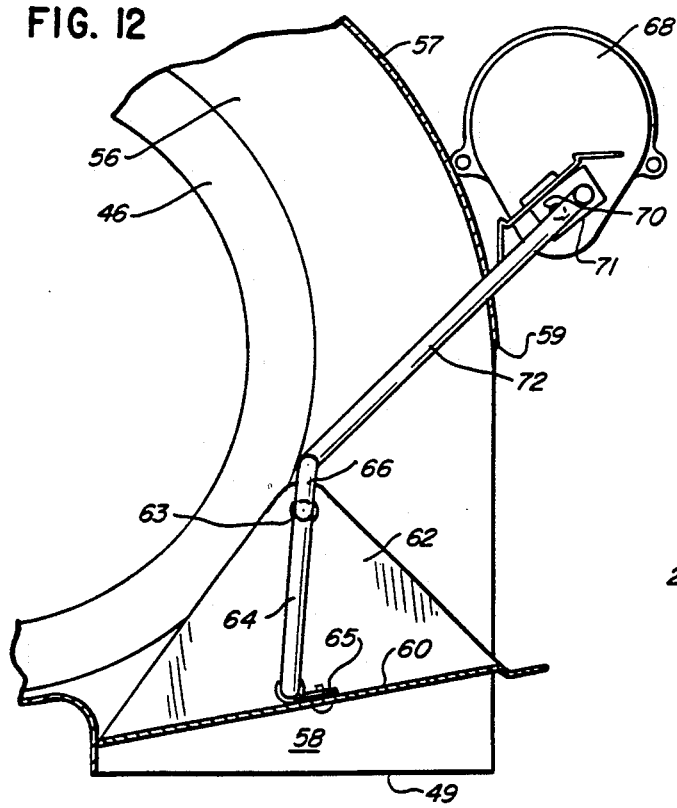
FIG. 12 is a fragmentary sectional view similar to FIG. 9 showing the exhaust door in the exhaust position.
Figure 13:
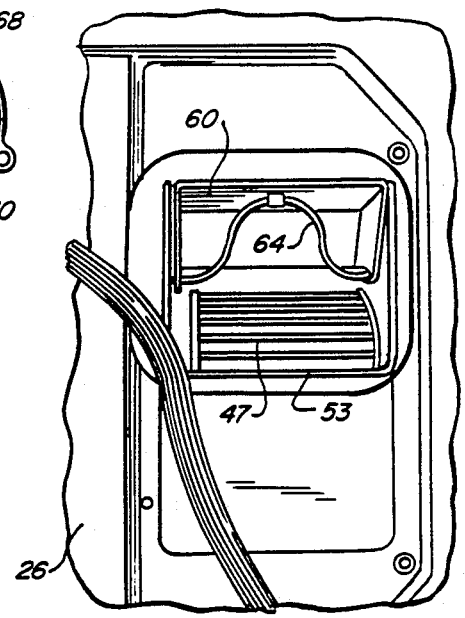
FIG. 13 is a fragmentary perspective view of the bottom of the air conditioning apparatus showing the outlet opening in the base plate.

When it is desired to remove stale room air from the living enclosure, the motor 68 is actuated to pivot the exhaust door into its FIG. 12 position in which it closes the outlet opening 49 of the evaporator blower housing and opens the exhaust opening 59. Air which is withdrawn from the living enclosure by the evaporator blower is discharged through the exhaust opening 59, and the exhaust air flows through the opening 75 and the rear panel 41 into the condenser compartment where it is discharged through the air vents in the outer shroud by the condenser blower 29. The condenser compartment is maintained at a negative pressure by the condenser blower 29, and communication between the exhaust opening 59 and the condenser compartment facilitates the removal of stale air from the living enclosure. The compressor of the air conditioning apparatus is turned off when the apparatus is run in the exhaust mode in order to conserve energy. When the electric motor 68 is turned off, the spring 73 returns the exhaust door to its original position illustrated in FIG. 9.

While in the foregoing specification a detailed description of a specific embodiment of the invention was set forth for the purpose of illustration, it will be understood that many of the details herein given may be varied considerably by those skilled in the art without departing from the spirit and scope of the invention.

We claim:

1. An air conditioning apparatus comprising a housing, the housing having an evaporator coil compartment and a condenser coil compartment, the evaporator coil compartment having an air inlet opening and an air outlet opening, an evaporator coil mounted in the evaporator coil compartment between the air inlet and air outlet openings thereof, an evaporator blower assembly mounted in the evaporator compartment for moving air through the air inlet opening of the evaporator compartment, through the evaporator coil, and through the air outlet opening of the evaporator coil compartment, the improvement comprising:

the evaporator blower assembly including a blower housing, a blower rotatably mounted in the blower housing, the blower housing having an exhaust opening and an air outlet opening which communicates with the air outlet opening of the evaporator compartment, an exhaust door movably mounted on the housing, and means for moving the exhaust door between a first position in which the exhaust door closes the exhaust opening in the blower housing and a second position in which the door closes substantially all of the air outlet opening of the blower housing and air can flow through the exhaust opening whereby air can be exhausted by the blower through the exhaust opening in the blower housing when the door is in the second position.

2. The apparatus of claim 1 in which the exhaust door is pivotally mounted on the blower housing, a motor mounted on the blower housing and having a drive shaft, and link means between the drive shaft and the exhaust door for moving the exhaust door between the first and second positions when the drive shaft rotates.

3. The apparatus of claim 2 including a door-mounting shaft rotatably mounted on the blower housing and terminating in a crank arm, the exhaust door being attached to the door-mounting shaft, said drive shaft terminating in a crank arm, said link means connecting said crank arms on the door-mounting shaft and on the drive shaft.

4. The apparatus of claim 1 including a wall in the housing between the evaporator blower and the condenser coil compartment, the wall having an opening through which exhaust air can flow from the exhaust opening in the blower housing into the condenser coil compartment.

5. An air conditioning apparatus comprising a housing, the housing containing a compressor and having an evaporator coil compartment and a condenser coil compartment, the evaporator coil compartment having an air inlet opening and an air outlet opening, an evaporator coil mounted in the evaporator coil compartment between the air inlet and air outlet openings thereof, an evaporator blower assembly mounted in the evaporator compartment for moving air through the air inlet opening of the evaporator compartment, through the evaporator coil, and through the air outlet opening of the evaporator coil compartment, the improvement comprising:

the evaporator blower assembly including a blower housing; a blower rotatably mounted in the blower housing; the blower housing having an exhaust opening and an air outlet opening which communicates with the air outlet opening of the evaporator compartment; an exhaust door movably mounted on the housing; means for moving the exhaust door between a first position in which the exhaust door closes the exhaust opening in the blower housing and a second position in which the door closes the air outlet opening of the blower housing and air can flow through the exhaust opening whereby air can be exhausted by the blower through the exhaust opening in the blower housing when the door is in the second position; and means for energizing the compressor when the door lies in the first position and for de-energizing the compressor when the door lies in the second position.

* * * * *